(12) United States Patent
Guo et al.

(10) Patent No.: US 12,316,462 B2
(45) Date of Patent: May 27, 2025

(54) TECHNIQUES FOR DETERMINING FEEDBACK TIMING CAPABILITY IN SIDELINK WIRELESS COMMUNICATIONS

(71) Applicant: QUALCOMM Incorporated, San Diego, CA (US)

(72) Inventors: Hui Guo, Beijing (CN); Sudhir Kumar Baghel, Fremont, CA (US); Kapil Gulati, Belle Mead, NJ (US); Shuanshuan Wu, San Diego, CA (US); Tien Viet Nguyen, Bridgewater, NJ (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 387 days.

(21) Appl. No.: 17/762,265

(22) PCT Filed: Oct. 6, 2020

(86) PCT No.: PCT/CN2020/119831
§ 371 (c)(1),
(2) Date: Mar. 21, 2022

(87) PCT Pub. No.: WO2021/078013
PCT Pub. Date: Apr. 29, 2021

(65) Prior Publication Data
US 2022/0338242 A1   Oct. 20, 2022

(30) Foreign Application Priority Data
Oct. 25, 2019 (WO) ................ PCT/CN2019/113245

(51) Int. Cl.
*H04L 1/1867* (2023.01)
*H04W 72/23* (2023.01)

(52) U.S. Cl.
CPC .......... *H04L 1/1887* (2013.01); *H04W 72/23* (2023.01)

(58) Field of Classification Search
CPC .................................................. H04L 1/1887
See application file for complete search history.

(56) References Cited

U.S. PATENT DOCUMENTS

| 10,383,137 B2 | 8/2019 | Gupta et al. |
| 2015/0110038 A1 | 4/2015 | Yang et al. |

(Continued)

FOREIGN PATENT DOCUMENTS

| CN | 108886709 A | 11/2018 |
| CN | 109391352 A | 2/2019 |

(Continued)

OTHER PUBLICATIONS

Huawei., et al., "Sidelink Resource Allocation Mode 1", 3GPP TSG RAN WG1 Meeting #98bis, R1-1910055, 3rd Generation Partnership Project, Mobile Competence Centre, 650, Route Des Lucioles, F-06921 Sophia Anti Polis Cedex, France, vol. RAN WG1, No. Chongqing, China, Oct. 14, 2019-Oct. 20, 2019, Oct. 8, 2019, XP051809065, 19 Pages, Paragraph [0003], figure 3, Section 3.

(Continued)

*Primary Examiner* — Jason E Mattis
(74) *Attorney, Agent, or Firm* — ArentFox Schiff LLP

(57) ABSTRACT

Some aspects described herein relate to determining, by a transmitter user equipment (UE) in sidelink communications with a receiver UE, a feedback forwarding timing capability based at least in part on a first timing for receiving and processing feedback from the receiver UE, and receiving, from an access point and based on the feedback forwarding timing capability, at least an uplink resource grant for transmitting feedback for at least one of sidelink communications or downlink communications. Other aspects relate to (Continued)

determining, by a transmitter UE in sidelink communications with a receiver UE, a timing capability for the receiver UE to at least one of receive sidelink communications from the transmitter UE or report feedback for the sidelink communications to the transmitter UE.

30 Claims, 9 Drawing Sheets

(56) References Cited

U.S. PATENT DOCUMENTS

| | | | |
|---|---|---|---|
| 2018/0054285 A1* | 2/2018 | Chen | H04L 1/1893 |
| 2018/0242364 A1 | 8/2018 | Park et al. | |
| 2019/0058554 A1 | 2/2019 | Liao et al. | |
| 2019/0075001 A1 | 3/2019 | Stern-Berkowitz et al. | |
| 2019/0110325 A1 | 4/2019 | Gulati et al. | |
| 2020/0275412 A1* | 8/2020 | Kim | H04B 7/06954 |
| 2021/0045100 A1* | 2/2021 | Park | H04W 72/21 |
| 2021/0050950 A1* | 2/2021 | Zhou | H04W 72/21 |
| 2022/0183002 A1* | 6/2022 | Yeo | H04L 1/1607 |
| 2022/0191831 A1* | 6/2022 | Park | H04L 1/1864 |

FOREIGN PATENT DOCUMENTS

| | | |
|---|---|---|
| CN | 109644455 A | 4/2019 |
| EP | 3616349 A1 | 3/2020 |
| WO | 2018022518 A1 | 2/2018 |
| WO | 2018130146 A1 | 7/2018 |

OTHER PUBLICATIONS

Intel Corporation: "NR V2X Sidelink Communication Under gNB Control", 3GPP TSG RAN WG1 Meeting #98, R1-1908634, 3rd Generation Partnership Project, Mobile Competence Centre, 650, Route Des Lucioles, F-06921 Sophia-Antipolis Cedex, France, vol. RAN WG1, No. Prague, Czech Republic, pp. 1-9, Aug. 26, 2019-Aug. 30, 2019, Aug. 17, 2019, XP051765242, Section 2.4.
Supplementary European Search Report—EP20879205—Search Authority—The Hague—Mar. 2, 2023.
Vivo: "Discussion on Mode 1 Resource Allocation Mechanism", 3GPP TSG RAN WG1 Meeting #98bis, R1-1911419, 3rd Generation Partnership Project, Mobile Competence Centre, 650, Route Des Lucioles, F-06921 Sophia-Antipolis Cedex, France, vol. RAN WG1, No. Chongqing, China, Oct. 14, 2019-Oct. 20, 2019, 15 Pages, Oct. 13, 2019, XP051800859, p. 6-p. 7, p. 4, Figures 4-10, Section 2.2.
Intel Corporation: "Summary for AI 7.2.4.2.2 Mode-2 Resource Allocation", 3GPP TSG RAN WG1 Meeting #96bis, R1-1905717, Summary of 5G V2X Mode 2 V2, 3rd Generation Partnership Project (3GPP), Mobile Competence Centre; Sophia-Antipolis Cedex, France, vol. RAN WG1, No. Xian, China, Apr. 8, 2019-Apr. 12, 2019, Apr. 9, 2019, 21 Pages, XP051707775, Retrieved from the Internet: URL: http://www.3gpp.org/ftp/tsg%5Fran/WG1%5FRL1/TSGR1%5F96b/Docs/R1%2D1905717%2Ezip. [Retrieved on Apr. 9, 2019] Aspect 3.2, Aspect 6, Aspect 7.
International Search Report and Written Opinion—PCT/CN2020/119831—ISA/EPO—Dec. 31, 2020.
International Search Report and Written Opinion—PCT/CN2019/113245—ISAEPO—Jul. 14, 2020.
Huawei, et al., "Sidelink Resource Allocation Mode 1", 3GPP TSG RAN WG1 Meeting #98bis, R1-1910055, Chongqing, China, Oct. 14, 2019-Oct. 20, 2019, 19 Pages.
Lenovo, et al., "Discussion on Resource Allocation for NR Sidelink Mode 1", 3GPP Draft, 3GPP TSG RAN WG1 #98bis, R1-1910145, Chongqing, China, Oct. 14, 2019-Oct. 20, 2019, Oct. 20, 2019, 8 Pages, XP051808446, The Whole Document.

\* cited by examiner

TECHNIQUES FOR DETERMINING FEEDBACK TIMING CAPABILITY IN SIDELINK WIRELESS COMMUNICATIONS

CROSS-REFERENCE TO RELATED APPLICATIONS

This application is a 35 U.S.C. § 371 National Phase of International Patent Application No. PCT/CN2020/119831, entitled "TECHNIQUES FOR DETERMINING FEEDBACK TIMING CAPABILITY IN SIDELINK WIRELESS COMMUNICATIONS" filed Oct. 6, 2020, which claims priority to International Patent Application No. PCT/CN2019/113245, entitled "TECHNIQUES FOR DETERMINING FEEDBACK TIMING CAPABILITY IN SIDELINK WIRELESS COMMUNICATIONS" filed Oct. 25, 2019, which are assigned to the assignee hereof and hereby expressly incorporated by reference herein for all purposes.

BACKGROUND

Aspects of the present disclosure relate generally to wireless communication systems, and more particularly, to feedback timing capability for reporting feedback for wireless communication.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable low-latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

In some wireless communication technologies, such as 5G, user equipment (UEs) communicate over one or more of multiple interfaces. The multiple interfaces may include a Uu interface between the UE and a base station, where the UE can receive communications from the base station over a downlink channel and transmit communications to the base station over an uplink channel. In addition, the multiple interfaces may include a sidelink interface to communicate with one or more other UEs directly over a sidelink channel (e.g., without traversing the base station).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication is provided. The method includes determining, by a transmitter user equipment (UE) in sidelink communications with a receiver UE, a feedback forwarding timing capability based at least in part on a first timing for receiving and processing feedback from the receiver UE, and receiving, from an access point and based on the feedback forwarding timing capability, at least an uplink resource grant for transmitting feedback for at least one of sidelink communications or downlink communications.

In another example, a method of wireless communication is provided that includes determining, for a transmitter UE in sidelink communications with a receiver UE, a feedback forwarding timing capability based at least in part on a first timing for receiving and processing feedback from the receiver UE, generating, based at least in part on the feedback forwarding timing capability, an uplink grant for the transmitter UE, and transmitting, to the transmitter UE, the uplink grant.

In another example, a method for wireless communication is provided that includes determining, by a transmitter user equipment (UE) in sidelink communications with a receiver UE, a timing capability for the receiver UE to at least one of receive sidelink communications from the transmitter UE or report feedback for the sidelink communications to the transmitter UE, generating, by the transmitter UE and based on the timing capability, a sidelink grant for the receiver UE for receiving sidelink communications from the transmitter UE and reporting feedback for the sidelink communications to the transmitter UE, and transmitting, by the transmitter UE, the sidelink grant to the receiver UE.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods and examples described above and further herein. In another aspect, an apparatus for wireless communication is provided that includes means for performing the operations of methods and examples described above and further herein. In yet another aspect, a computer-readable medium is provided including code executable by one or more processors to perform the operations of methods and examples described above and further herein.

For example, an apparatus for wireless communication is provided that includes a transceiver, a memory configured to store instructions, and one or more processors communicatively coupled with the memory and the transceiver. The one or more processors are configured to determine, by the apparatus as a transmitter UE in sidelink communications with a receiver UE, a feedback forwarding timing capability based at least in part on a first timing for receiving and processing feedback from the receiver UE, and receive, from an access point and based on the feedback forwarding timing capability, at least an uplink resource grant for transmitting feedback for at least one of sidelink communications or downlink communications.

In another example, an apparatus for wireless communication is provided that includes a transceiver, a memory configured to store instructions, and one or more processors communicatively coupled with the memory and the transceiver. The one or more processors are configured to determine, for a transmitter UE in sidelink communications with a receiver UE, a feedback forwarding timing capability based at least in part on a first timing for receiving and processing feedback from the receiver UE, generate, based at least in part on the feedback forwarding timing capability, an uplink grant for the transmitter UE, and transmit, to the transmitter UE, the uplink grant.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
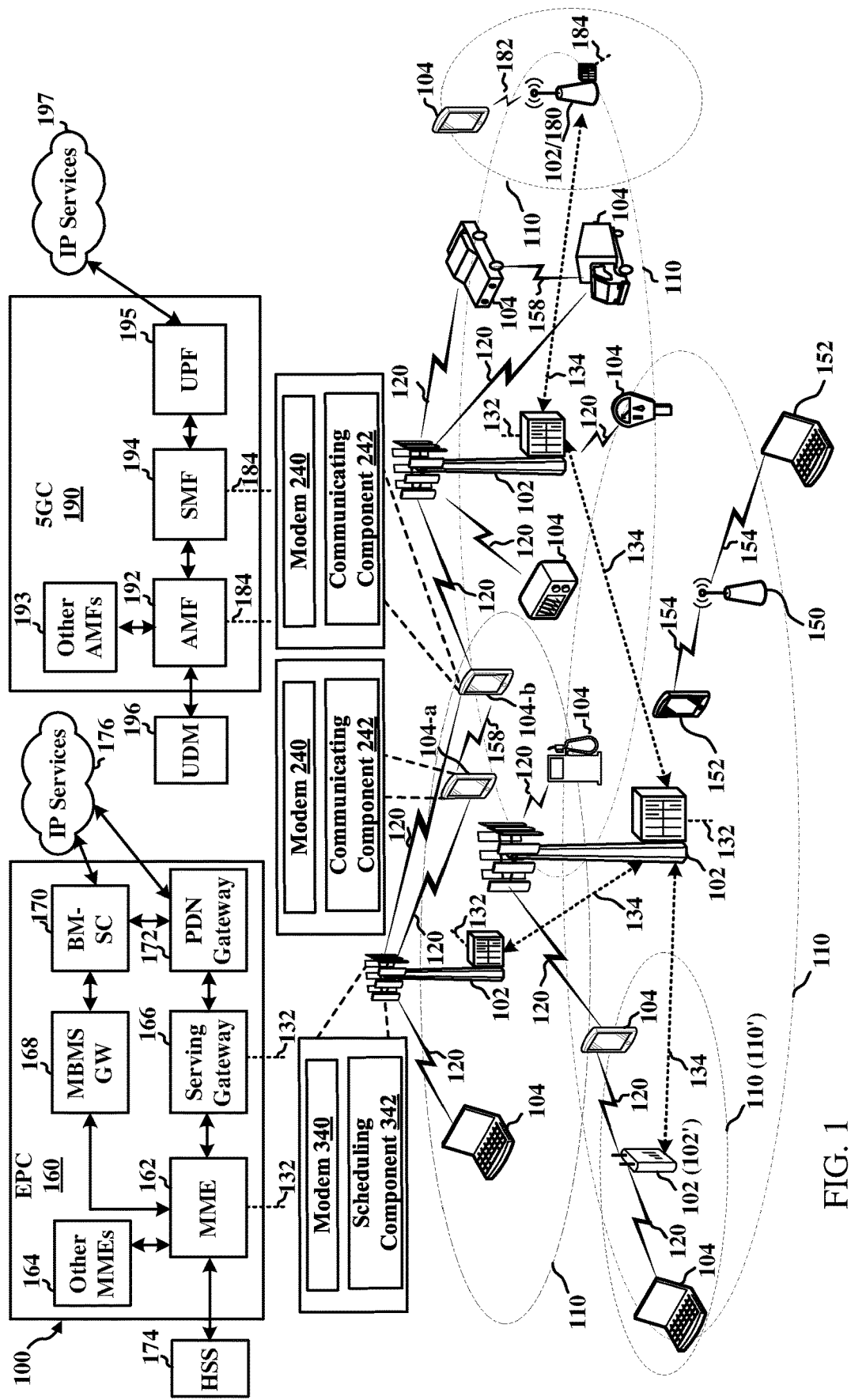
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to determining a feedback timing capability for a user equipment (UE) to report feedback for received wireless communications. Where the UE is configured for sidelink communications, the feedback timing capability may include a feedback forwarding timing capability to account for a timing associated with transmitting sidelink communications to a receiver UE, receiving feedback for the sidelink communications, etc. Based on this additional timing, resources can be scheduled for communications over the sidelink interface and/or a Uu interface (e.g., downlink and/or uplink communications with an access point). In another example, a transmitter UE in sidelink communications (e.g., the UE transmitting communications to a receiver UE in sidelink communications) can schedule resources for the receiver UE (e.g., the UE receiving communications from the transmitter UE in sidelink communications) to receive communications from the transmitter UE and report feedback based on a feedback timing capability determined for the receiver UE.

In a specific example, there can be different resource allocation modes for sidelink communications, including resource allocation mode 1 where an access point (e.g., gNB) schedules (via a sidelink grant to a transmitter UE) sidelink resources for a transmitter UE to transmit sidelink communications to a receiver UE, and resource allocation mode 2 where the transmitter UE can schedule resources for transmitting sidelink communications to the receiver UE. In resource allocation mode 1, for example, a dynamic or semi-static grant (e.g., generated by the access point) provides resources for one or multiple SL transmissions. SL feedback (e.g., sidelink hybrid automatic repeat/request (HARQ) feedback, which can include HARQ-acknowledgement (ACK) and/or HARQ-negative ACK (NACK)) can be transmitted from the receiver UE to transmitter UE, and the SL HARQ can further be forwarded from the transmitter UE to the access point (e.g., gNB) so that the retransmission resource can be requested from the access point. In resource allocation mode 2, the transmitter UE can schedule the SL resource for the specific receiver UE. SL HARQ feedback can then be transmitted from the receiver UE to transmitter UE. The transmitter UE can know the receiver UE's processing capability to schedule feedback resources for transmitting the SL HARQ feedback.

For example, for sidelink (SL) transmission, feedback can be transmitted using a physical sidelink feedback channel (PSFCH) from receiver UE(s) to transmitter UE. In resource allocation mode 1, the feedback from the receiver UE can be further forwarded from the transmitter UE to the access point (e.g., via an uplink channel on a Uu interface, such as a physical uplink control channel (PUCCH) and/or physical uplink shared channel (PUSCH)) to obtain retransmission resource from the network to allow the transmitter UE to retransmit the sidelink communication to the receiver UE (e.g., in case of HARQ-NACK feedback). To facilitate this functionality, for example, the access point (e.g., gNB) may determine and/or use a feedback forwarding timing capability to indicate the PUCCH/PUSCH resources for the feedback by SL downlink control information (DCI). Aspects described herein relate to informing the access point of certain timings to allow the access point to determine a feedback forwarding timing capability, in resource allocation mode 1, to facilitate allocating and/or scheduling (e.g., via PDCCH SL DCI format) resources for forwarding sidelink HARQ feedback. For resource allocation mode 2, the transmitter UE may need to know the SL data-to-HARQ timing capability of the receiver UE, to allocate SL feedback resource (e.g., via PSFCH). Aspects described herein also relate to a transmitter UE determining timing capability of the receiver UE in resource allocation mode 2 for scheduling sidelink communication and feedback resources.

In an example, aspects described herein relate to SL HARQ timing capability report design so that an access point (e.g., gNB) or transmitter UE can allocate feedback resources properly for resource allocation mode 1 and 2, respectively. In one example, this may also include multiplexing timing consideration with Uu HARQ in resource allocation mode 1.

The described features will be presented in more detail below with reference to FIGS. 1-9.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for determining and/or reporting a feedback forwarding timing capability, or other timing capability related to sidelink communications, etc. In addition, some nodes may have a modem 340 and scheduling component 342 for scheduling sidelink communication resources and/or Uu communication resources based on a received feedback forwarding timing capability or other timing capability related to sidelink communications, as described herein. Though UEs 104-*a* and 104-*b* is shown as having the modem 240 and communicating component 242 and a base station 102 is shown as having the modem 340 and scheduling component 342, this is one illustrative example, and substantially any node or type of node may include a modem 240 and communicating component 242 and/or a modem 340 and scheduling component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG- RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs (e.g., UE 104-a and 104-b) may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, communicating component 242 of UE 104-a or 104-b (and/or other UEs) can determine and/or report a timing capability for reporting feedback for wireless communications, such as sidelink communications. In an example, the UE 104-a can be a transmitter UE that transmits sidelink communications to UE 104-b, which can be a receiver UE that receives the sidelink communications. In this example, communicating component 242 of UE 104-a can be configured to determine and/or report a feedback forwarding timing capability to a base station 102 for sidelink resource allocation mode 1, as described further herein. In another example, communicating component 242 of UE 104-b can be configured to determined and/or report a timing capability for transmitting feedback for sidelink communications to the transmitter UE 104-a in resource allocation modes 1 or 2, as described further herein. In addition, for example, scheduling component 342 of base station 102 can be configured to determine resource grants for sidelink and/or Uu (e.g., uplink and/or downlink) resources for the UE 104-a based at least in part on a feedback forwarding timing capability.

Figure 2:
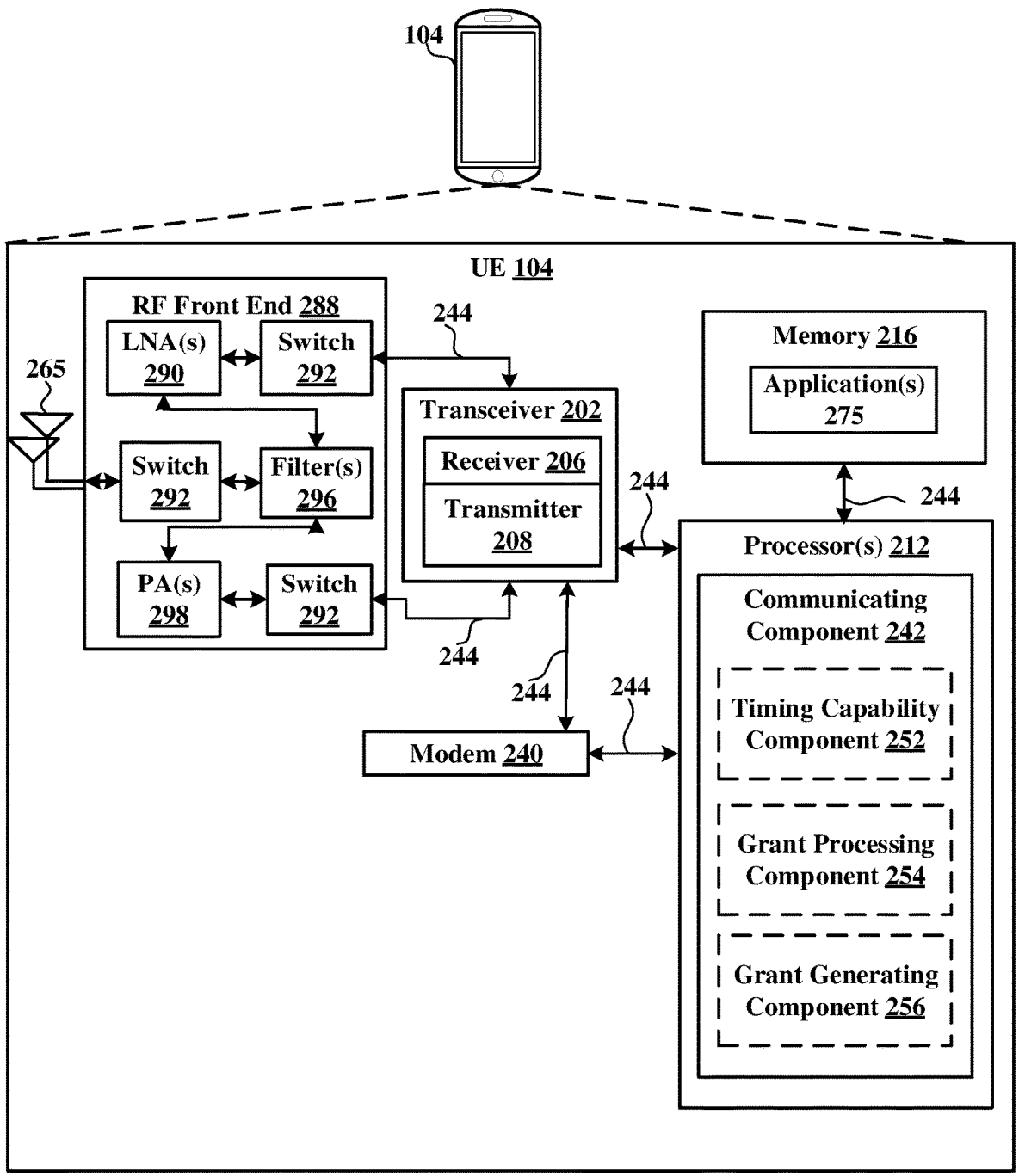
FIG. 2 is a block diagram illustrating an example of a UE, in accordance with various aspects of the present disclosure.
Figure 3:
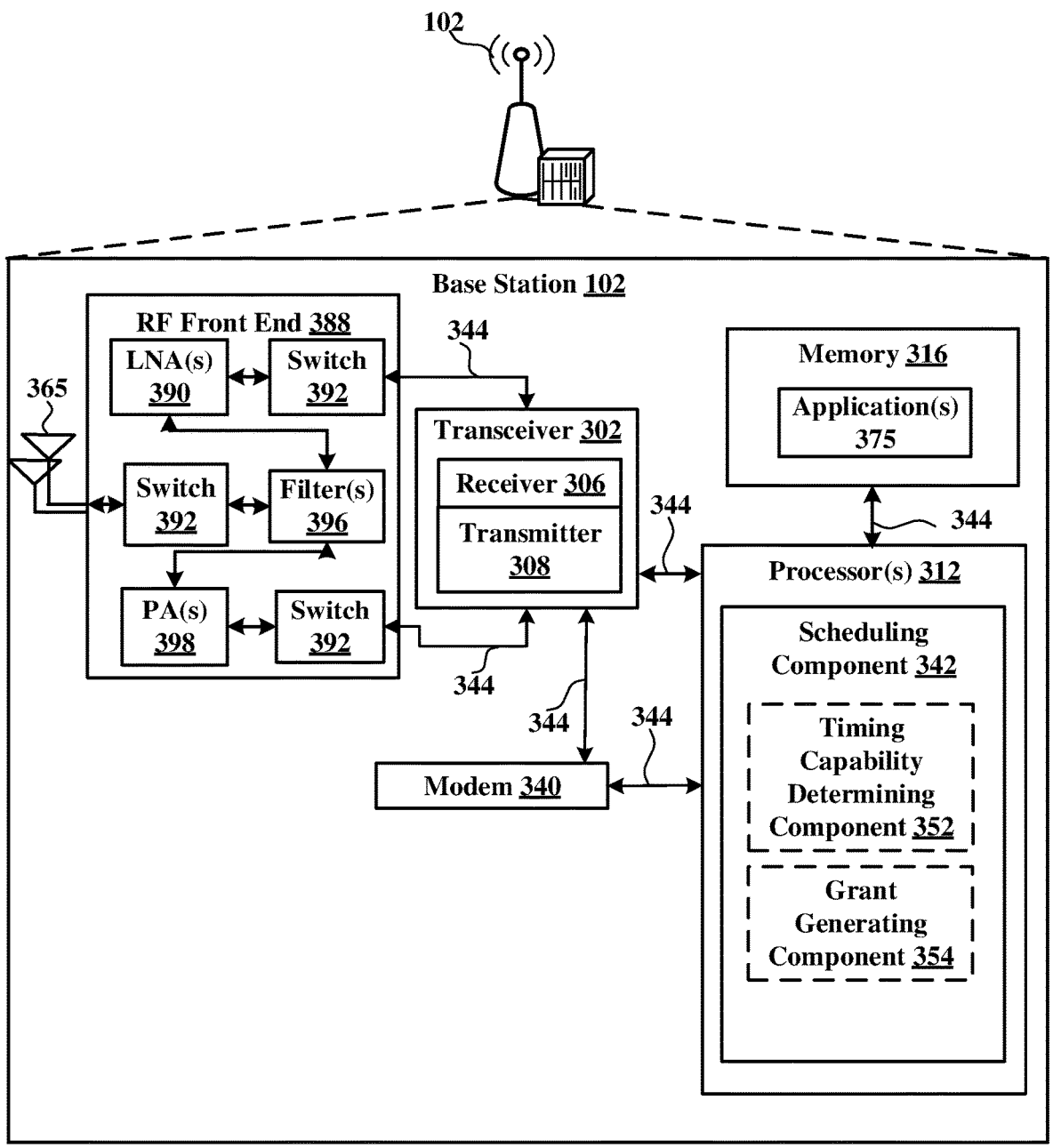
FIG. 3 is a block diagram illustrating an example of a base station, in accordance with various aspects of the present disclosure.
Figure 4:
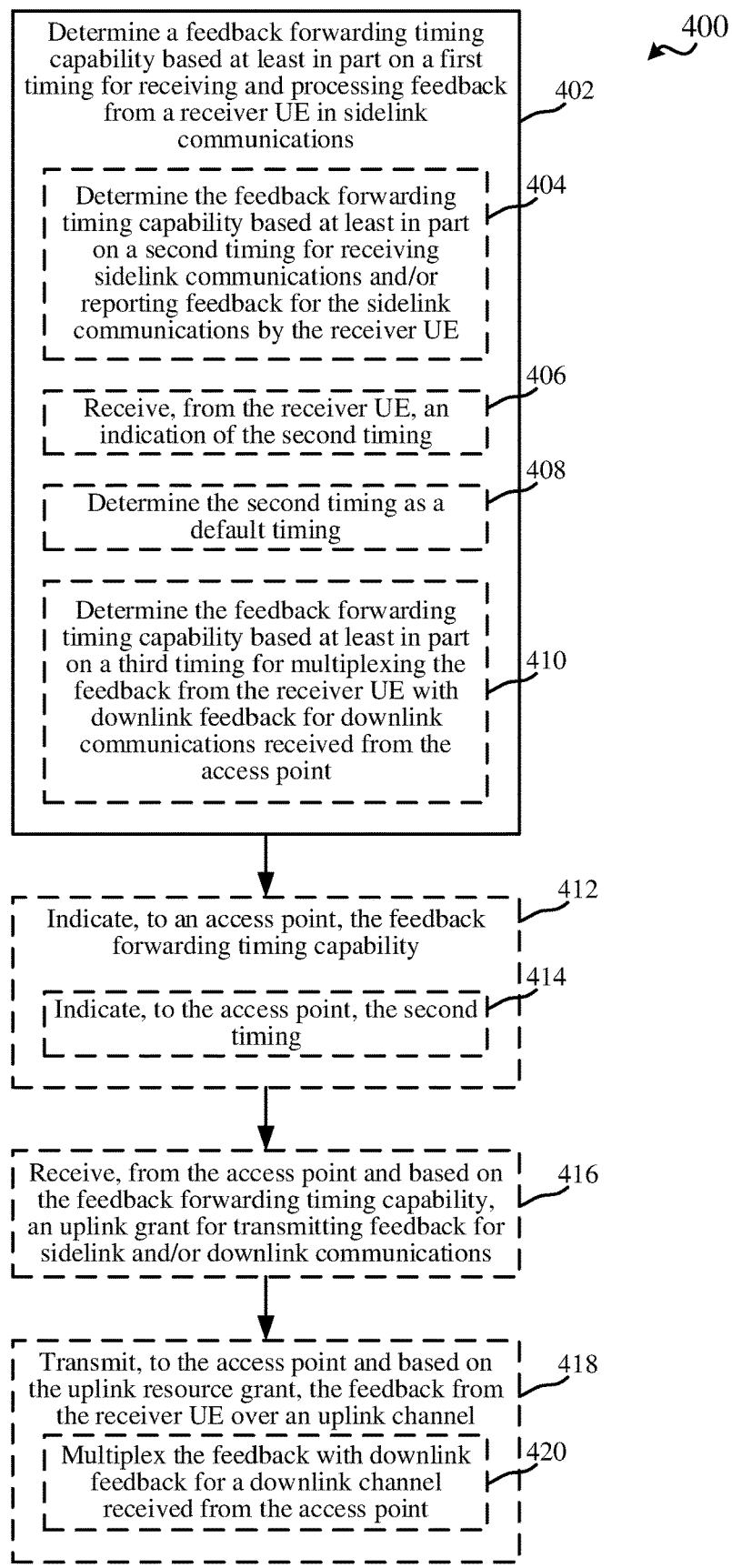
FIG. 4 is a flow chart illustrating an example of a method for determining a feedback forwarding timing capability, in accordance with various aspects of the present disclosure.
Figure 5:
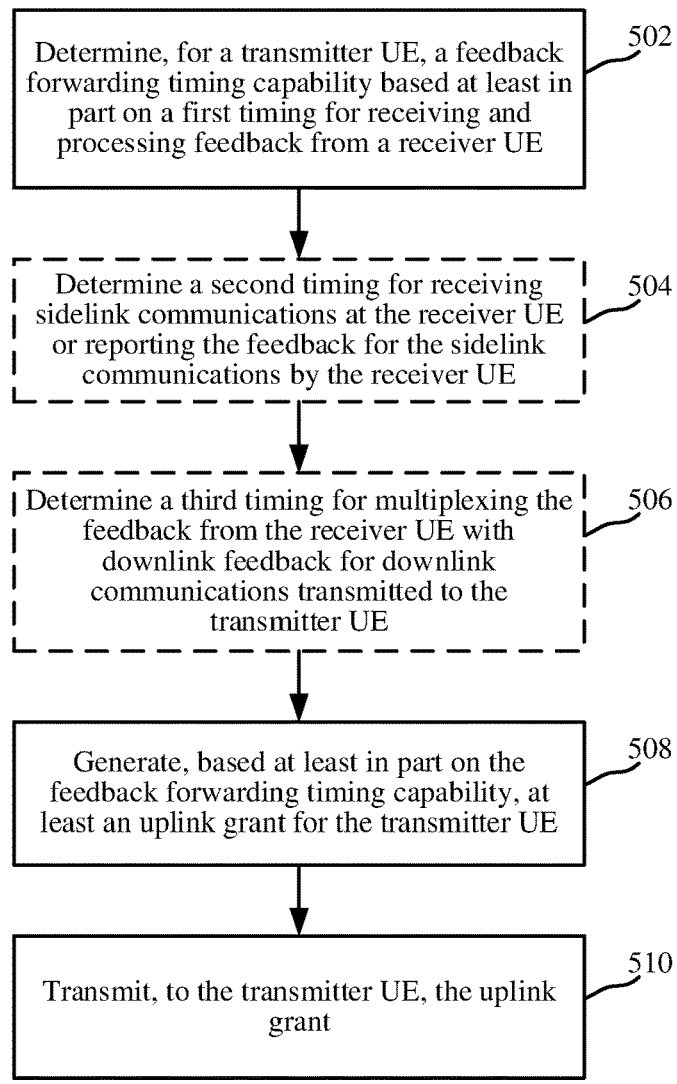
FIG. 5 is a flow chart illustrating an example of a method for generating grants based on a feedback forwarding timing capability, in accordance with various aspects of the present disclosure.
Figure 6:
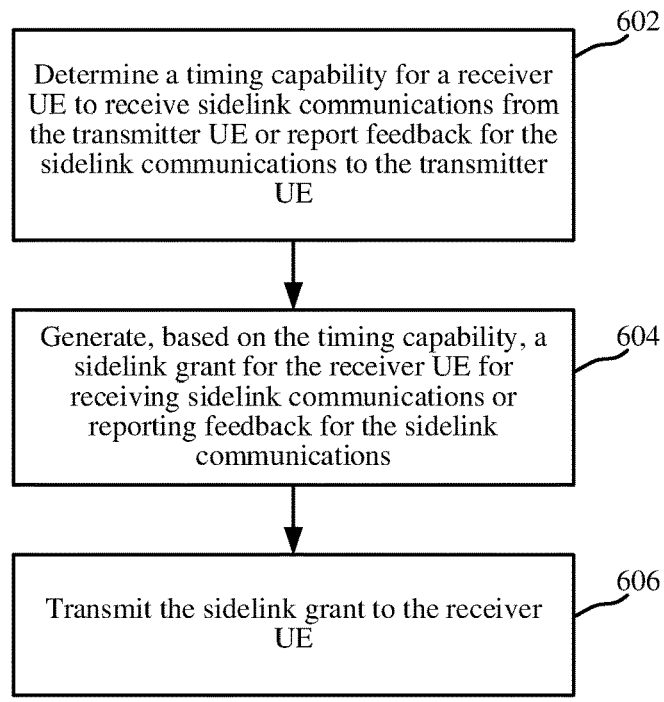
FIG. 6 is a flow chart illustrating an example of a method for generating grants for sidelink communications, in accordance with various aspects of the present disclosure.

Turning now to FIGS. 2-9, aspects are depicted with reference to one or more components and one or more methods that may perform the actions or operations described herein, where aspects in dashed line may be optional. Although the operations described below in FIGS. 4-6 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for determining and/or reporting a timing capability to a base station 102 and/or another UE 104, as described herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware and/or software executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware and/or software executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a timing capability component 252 for determining a timing capability associated with transmitting feedback for sidelink communications, which may include a feedback forwarding timing capability that includes a time for forwarding feedback from a receiver UE to an access point, a grant processing component 254 for obtaining and/or utilizing a sidelink grant for sidelink communications with another UE (e.g., in resource allocation mode 1 or 2), and/or a grant generating component 256 for generating a sidelink grant for another UE to receive sidelink communications from the UE 104 (e.g., in resource allocation mode 2), as described herein.

Figure 9:
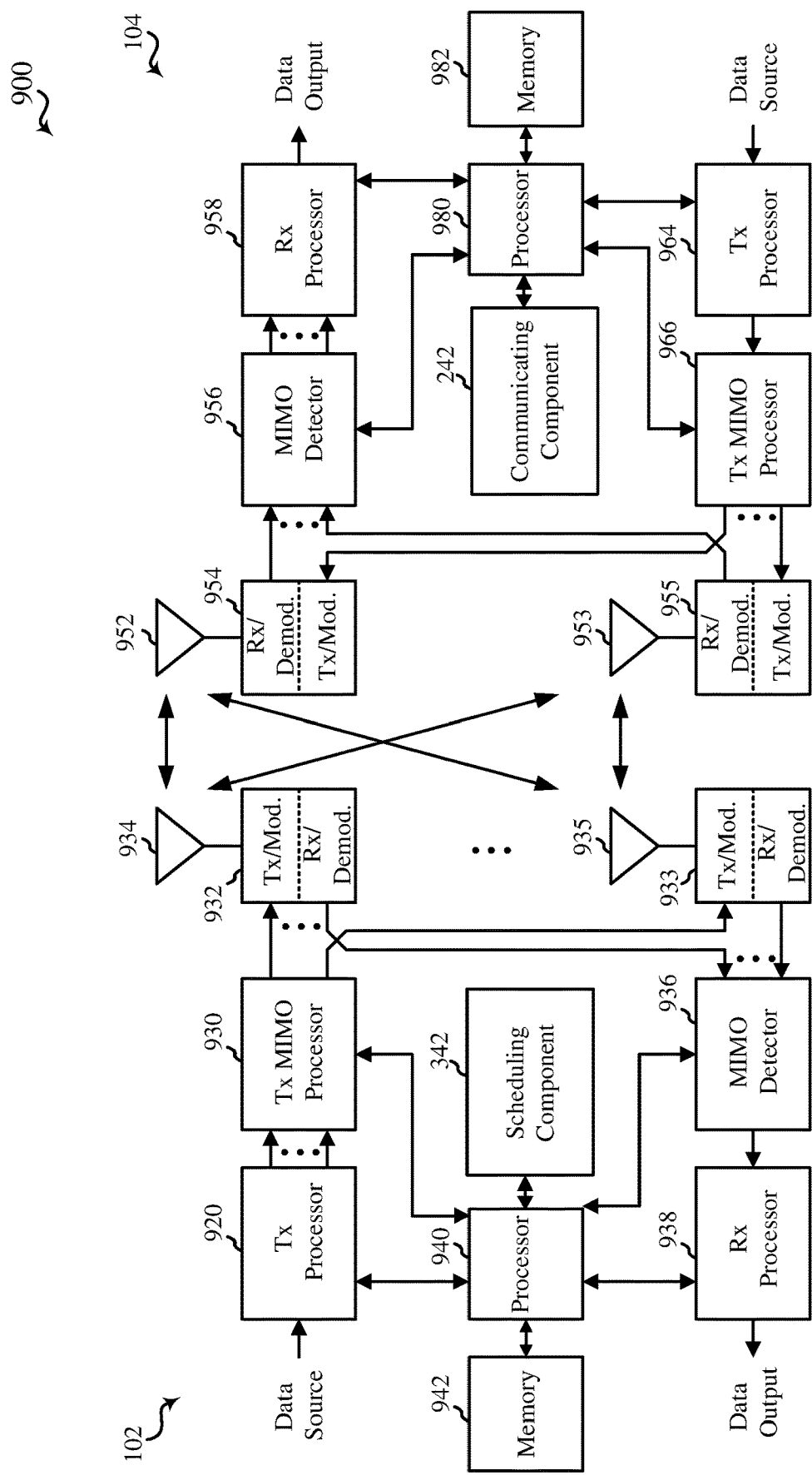
FIG. 9 is a block diagram illustrating an example of a MIMO communication system including a base station and a UE, in accordance with various aspects of the present disclosure.

In an aspect, the processor(s) 212 may correspond to one or more of the processors described in connection with the UE in FIG. 9. Similarly, the memory 216 may correspond to the memory described in connection with the UE in FIG. 9.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and scheduling component 342 for generating resource grants for one or more UEs based on determined or indicated timing capabilities, as described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, scheduling component 342 can optionally include a timing capability determining component 352 for determining a timing capability related to one or more UEs, such as a feedback forwarding timing capability, and/or a grant generating component 354 for generating a sidelink resource grant and/or an uplink or downlink resource grant for a UE based on an indicated timing capability, as described herein.

In an aspect, the processor(s) 312 may correspond to one or more of the processors described in connection with the base station in FIG. 9. Similarly, the memory 316 may correspond to the memory described in connection with the base station in FIG. 9.

FIG. 4 illustrates a flow chart of an example of a method 400 for determining a feedback forwarding timing capability. In an example, a UE (e.g., UE 104-a) can perform the functions described in method 400 using one or more of the components described in FIGS. 1 and 2.

In method 400, at Block 402, a feedback forwarding timing capability can be determined based at least in part on a first timing for receiving and processing feedback from a receiver UE in sidelink communications. In an aspect, timing capability component 252, e.g., in conjunction with processor(s) 212, memory 216, transceiver 202, communicating component 242, etc., can determine a feedback forwarding timing capability based at least in part on the first timing for receiving and processing feedback from a receiver UE in sidelink communications. For example, the feedback forwarding timing capability can be used to indicate at least the first timing corresponding to feedback processing at the transmitter UE (e.g., a timing for HARQ reception of HARQ feedback from a receiver UE and processing of the HARQ feedback). For example, the first timing can correspond to resource allocation mode 1 for sidelink communications where the transmitter UE 104-*a* reports feedback received by the receiver UE (e.g., UE 104-*b*) to request additional resources to retransmit sidelink communications to the receiver UE where HARQ-NACK is received from the receiver UE. In an example, timing capability component 252 can determine the feedback forwarding timing capability as a default value. In an example, the default value can be common for multiple UEs served by the access point and/or can account for at least the first timing (and/or a second timing, as described further herein). In addition, in one example, the default value may be based on a payload and/or MCS of sidelink communications.

In one example, in determining the feedback forwarding timing capability at Block 402, optionally at Block 404, the feedback forwarding timing capability can also be determined based at least in part on a second timing for receiving sidelink communications and/or reporting feedback for the sidelink communications by the receiver UE. In an aspect, timing capability component 252, e.g., in conjunction with processor(s) 212, memory 216, transceiver 202, communicating component 242, etc., can determine the feedback forwarding timing capability based at least in part on the second timing for receiving sidelink communications and/or reporting feedback for the sidelink communications by the receiver UE. For example, the second timing can include a time for reception, at the receiver UE, of PSSCH data transmitted by the transmitter UE and/or a time for reporting of feedback for the PSSCH data from the receiver UE to the transmitter UE. In any case, in an example, timing capability component 252 can determine the feedback forwarding timing capability to include, or otherwise based on, at least a sum of the first timing and the second timing. In this example, the transmitter UE (e.g., UE 104-*a*) can gather the timing capability information for the receiver UE and determine its own timing capability information for receiving and reporting feedback from the receiver UE, and can transmit this information and/or a computed feedback forwarding timing capability to the access point (e.g., base station 102) to facilitate scheduling uplink resources for the transmitter UE. In an example, timing capability component 252 can determine the feedback forwarding timing capability as the default value, as described above, which can be common for multiple UEs served by the access point and/or can account for at least the first timing and the second timing.

In one example, in determining the feedback forwarding timing capability at Block 402, optionally at Block 406, an indication of the second timing can be received from the receiver UE. In an aspect, timing capability component 252, e.g., in conjunction with processor(s) 212, memory 216, transceiver 202, communicating component 242, etc., can receive, from the receiver UE, an indication of the second timing. For example, the receiver UE (e.g., UE 104-*b*) can transmit the indication of the second timing (e.g., the timing capability of the receiver UE to receive sidelink communications and/or report feedback for the sidelink communications) to the transmitter UE (e.g., UE 104-*a*) using a control channel (e.g., PSCCH), in a groupcast message, and/or using higher layer signaling, such as radio resource control (RRC) layer or other layer signaling.

In another example, in determining the feedback forwarding timing capability at Block 402, optionally at Block 408, the second timing can be determined as a default timing. In an aspect, timing capability component 252, e.g., in conjunction with processor(s) 212, memory 216, transceiver 202, communicating component 242, etc., can determine the second timing as a default timing. For example, the receiver UE may not or may not be able to report its timing capability, and thus a default timing can be determined and used in this case. For example, in certain cases, e.g. receiver UE is out of coverage, then its timing capability (e.g., data-to-HARQ capability) is to be acquired by transmitter UE. When such report is not supported via high layer signaling, e.g., in groupcast, a default processing timing table defined for the receiver UE can be processed, which may be in terms of a certain payload and/or MCS for the sidelink communications. In another example, a default processing timing configuration/capability can be supported (and determined) by all UEs.

In another example, in determining the feedback forwarding timing capability at Block 402, optionally at Block 410, the feedback forwarding timing capability can be determined based at least in part on a third timing for multiplexing the feedback from the receiver UE with downlink feedback for downlink communications received from the access point. In an aspect, timing capability component 252, e.g., in conjunction with processor(s) 212, memory 216, transceiver 202, communicating component 242, etc., can determine the feedback forwarding timing capability based at least in part on the third timing for multiplexing the feedback from the receiver UE with downlink feedback for downlink communications received from the access point. In an example, the timing for multiplexing the feedback from the receiver UE (related to the sidelink communications) with the downlink feedback for downlink communication received from the access point (e.g., feedback related to physical downlink control channel (PDCCH)/physical downlink shared channel (PDSCH) communications) may depend on HARQ codebook types used and/or HARQ handling/dropping rules configured for the transmitter UE. Thus, the HARQ codebook types and HARQ handling/dropping rules can be taken into account when calculating the feedback forwarding timing capability. In an example, timing capability component 252 can determine the feedback forwarding timing capability as a default value, which can be common for multiple UEs served by the access point and/or can account for at least the first timing, the second timing and/or the third timing.

In any case, in an example, timing capability component 252 can determine the feedback forwarding timing capability to include at least a sum of the first timing and the third timing (and/or the second timing). In this example, the transmitter UE (e.g., UE 104-*a*) can gather the timing capability information for the receiver UE and determine its own timing capability information for receiving and reporting feedback from the receiver UE and its own timing capability information for multiplexing or dropping processing with Uu HARQ and/or channel state information (CSI) bits, and can transmit this information and/or a computed feedback forwarding timing capability to the access point (e.g., 209) to facilitate scheduling uplink resources for the transmitter UE.

In method 400, optionally at Block 412, the feedback forwarding timing capability can be indicated to the access point. In an aspect, timing capability component 252, e.g., in conjunction with processor(s) 212, memory 216, transceiver 202, communicating component 242, etc., can indicate, to the access point, the feedback forwarding timing capability. For example, timing capability component 252 can indicate the feedback forwarding timing capability whether based on the first timing, the second timing, and/or the third timing, as described above. This can enable the access point (e.g., base station 102) to schedule uplink resources for the transmitter UE (e.g., UE 104-*a*) to retransmit sidelink communications to the receiver UE in resource allocation mode 1, as described. In an example, the feedback forwarding timing capability may be indicated as a period of time between when a resource grant is received by the transmitter UE (e.g., a sidelink resource grant for transmitting sidelink communications) and when the transmitter UE can transmit feedback related to sidelink communications transmitted to one or more receiver UEs over the sidelink resources. In another example, the feedback forwarding timing capability may be indicated as a period of time between the sidelink resources of a sidelink feedback channel (e.g., a last time period of the sidelink feedback channel) and when the transmitter UE can transmit, to the access point, feedback received over the sidelink feedback channel. Moreover, in an example, timing capability component 252 can indicate the feedback forwarding timing capability to the access point using a control channel (e.g., PUCCH), using higher layer signaling, such as RRC layer signaling, etc.

In one example, in indicating the feedback forwarding timing capability at Block 412, optionally at Block 414, the second timing can be indicated to the access point. In an aspect, timing capability component 252, e.g., in conjunction with processor(s) 212, memory 216, transceiver 202, communicating component 242, etc., can indicate, to the access point, the second timing. In one example, this can be a transmitter UE (e.g., UE 104-*a*) indicating the second timing as received in an indication from the receiver UE or as determined to be one of one or more default values, as described above. In another example, this can be a receiver UE (e.g., UE 104-*b*) transmitting its timing capability information to the access point. In either case, in this example, the access point can determine the feedback forwarding timing capability for the transmitting UE at least in part by adding the second timing to the received feedback forwarding timing capability. In other words, as described further herein in this example, the access point (e.g., gNB) can gather all UE capabilities to get the HARQ forwarding timing, including the receiver UE's data-to-HARQ capability (e.g., the second timing described above) and transmitter UE's HARQ processing and multiplexing/dropping timing (e.g., the first and third timings described above), if both transmitter UE and receiver UE's timing capability is reported by high layer signaling.

In one example, in method 400, optionally at Block 416, an uplink grant for transmitting feedback for sidelink and/or downlink communications can be received from the access point and based on the feedback forwarding timing capability. In an aspect, grant processing component 254, e.g., in conjunction with processor(s) 212, memory 216, transceiver 202, communicating component 242, etc., can receive, from the access point and based on the feedback forwarding timing capability, the uplink grant for transmitting feedback for sidelink and/or downlink communications. For example, grant processing component 254 can receive the uplink grant for PUCCH and/or PUSCH resources for reporting sidelink feedback and/or downlink feedback. In an example, grant processing component 254 can receive the uplink grant from the access point (e.g., gNB) over a PDCCH in a DCI, etc. The uplink grant can be based on the feedback forwarding timing capability to allow the transmitter UE sufficient time to transmit sidelink communications to the receiver UE, receive sidelink feedback from the receiver UE, multiplex the sidelink feedback with downlink feedback for one or more downlink communications (received over a PDCCH or PDSCH), etc.

In one example, in method 400, optionally at Block 418, feedback from the receiver UE can be transmitted over an uplink to the access point and based on the uplink resource grant. In an aspect, communicating component 242, e.g., in conjunction with processor(s) 212, memory 216, transceiver 202, etc., can transmit, to the access point and based on the uplink resource grant, the feedback from the receiver UE over an uplink channel. As described, communicating component 242 can receive the feedback for sidelink communications transmitted by the transmitter UE to the receiver UE. For example, communicating component 242 can transmit the feedback according to the feedback forwarding timing capability in the uplink resources of the uplink resource grant that are scheduled based on the capability (e.g., after receiving a sidelink resource grant from the access point, as described above). In addition, for example, transmitting the feedback may cause the access point to grant additional sidelink resources to the transmitter UE to retransmit the sidelink communication to the receiving UE.

In an example, in transmitting the feedback at Block 418, optionally at Block 420, the feedback can be multiplexed with downlink feedback for a downlink channel received from the access point. In an aspect, communicating component 242, e.g., in conjunction with processor(s) 212, memory 216, transceiver 202, etc., can multiplex the feedback with downlink feedback for the downlink channel received from the access point. For example, communicating component 242 can transmit the multiplexed feedback to the access point so the access point can determine whether to grant additional sidelink resources to the transmitter UE for retransmitting sidelink communications to the receiver UE and/or whether to retransmit downlink communications to the transmitter UE.

FIG. 5 illustrates a flow chart of an example of a method 500 for determining a feedback forwarding timing capability for a UE. In an example, a gNB or other base station/access point (e.g., base station 102) can perform the functions described in method 500 using one or more of the components described in FIGS. 1 and 3.

In method 500, at Block 502, a feedback forwarding timing capability can be determined a transmitter UE based at least in part on a first timing for receiving and processing feedback from a receiver UE. In an aspect, timing capability determining component 352, e.g., in conjunction with processor(s) 312, memory 316, transceiver 302, scheduling component 342, etc., can determine, for the transmitter UE (e.g., UE 104-*a*), the feedback forwarding timing capability based at least in part on the first timing for receiving and processing feedback from the receiver UE. As described, the feedback forwarding timing capability can include at least the first timing related to receiving and processing the feedback from the receiver UE, but may also include other timings, such as a timing for the receiver UE to receive and provide feedback for sidelink communications, a timing for multiplexing the feedback from the receiver UE with feedback for downlink communications received at the transmitter UE, etc. In one example, timing capability determining component 352 can determine the feedback forwarding timing capability as a default value (e.g., which can be used for multiple UEs). In another example, timing capability determining component 352 can receive an indication of the feedback forwarding timing capability for the UE, as described further herein.

In an example, in method 500, optionally at Block 504, a second timing for receiving sidelink communications at the receiver UE or reporting feedback for the sidelink communications by the receiver UE can be determined. In an aspect, timing capability determining component 352, e.g., in conjunction with processor(s) 312, memory 316, transceiver 302, scheduling component 342, etc., can determine the second timing for receiving sidelink communications at the receiver UE or reporting the feedback for the sidelink communications by the receiver UE. For example, timing capability determining component 352 can receive the second timing as an indication from the receiver UE, as an indication from the transmitter UE (e.g., where the transmitter UE receives the second timing from the receiver UE or determines a default timing, as described above), or can determine the second timing as a default timing, as described above. In an example, where the timing capability determining component 352 determines the second timing, it can add the second timing to the received feedback forwarding timing capability in determining a timing capability based on which to generate a resource grant, as described above and further herein.

In an example, in method 500, optionally at Block 506, a third timing for multiplexing the feedback received from the receiver UE with downlink feedback for downlink communications transmitted to the transmitter UE can be determined. In an aspect, timing capability determining component 352, e.g., in conjunction with processor(s) 312, memory 316, transceiver 302, scheduling component 342, etc., can determine the third timing for multiplexing the feedback from the receiver UE with downlink feedback for downlink communications transmitted to the transmitter UE For example, timing capability determining component 352 can receive the third timing as an indication from the transmitter UE, or can determine the third timing as a default or otherwise configured timing. In an example, where the timing capability determining component 352 determines the third timing, it can add the third timing to the received feedback forwarding timing capability (and/or to the second timing, where determined) in determining a timing capability based on which to generate a resource grant, as described above and further herein.

In method 500, at Block 508, at least an uplink grant for the transmitter UE can be generated based at least in part on the feedback forwarding timing capability. In an aspect, grant generating component 354, e.g., in conjunction with processor(s) 312, memory 316, transceiver 302, scheduling component 342, etc., can generate, based at least in part on the feedback forwarding timing capability, at least the uplink grant for the transmitter UE. For example, grant generating component 354 can generate the uplink grant to allow enough time for the transmitter UE to transmit feedback for sidelink communications after receiving the sidelink resource grant for transmitting the sidelink communications to the receiver UE. In addition, grant generating component 354 can generate the sidelink grant for the transmitter UE and can generate the uplink grant for feedback based on the sidelink grant. Moreover, in an example, grant generating component 354 can generate a downlink grant for the transmitter UE to receive downlink communications during the feedback forwarding timing.

In method 500, at Block 510, the uplink grant can be transmitted to the transmitter UE. In an aspect, scheduling component 342, e.g., in conjunction with processor(s) 312, memory 316, transceiver 302, etc., can transmit, to the transmitter UE, the uplink grant. For example, scheduling component 342 can transmit the uplink grant over a PDCCH following (or along with) transmission of a sidelink grant to the transmitter UE for transmitting sidelink communications to the receiver UE. For example, scheduling component 342 can transmit the uplink grant (e.g., as a HARQ forwarding resource) via SL DCI format or higher layer signaling.

FIG. 6 illustrates a flow chart of an example of a method 600 for determining a timing capability for a receiver UE in sidelink communications. In an example, a UE (e.g., UE 104-a) can perform the functions described in method 600 using one or more of the components described in FIGS. 1 and 2.

In method 600, at Block 602, a timing capability for a receiver UE to receive sidelink communications from a transmitter UE or report feedback for the sidelink communications to the transmitter UE can be determined. In an aspect, timing capability component 252, e.g., in conjunction with processor(s) 212, memory 216, transceiver 202, communicating component 242, etc., can determine the timing capability for the receiver UE to receive sidelink communications from the transmitter UE or report feedback for the sidelink communications to the transmitter UE. As described above, this can include receiving an indication of the timing capability from the receiver UE, determining a default value for the timing capability for the receiver UE (e.g., based on a payload in sidelink communications, MCS, etc., or otherwise). The timing capability can relate to a timeline for receiving sidelink communications and when the receiving UE is able to report feedback for the sidelink communications, as described.

In method 600, at Block 604, a sidelink grant for the receiver UE for receiving sidelink communications or reporting feedback for the sidelink communications can be generated. In an aspect, grant generating component 256, e.g., in conjunction with processor(s) 212, memory 216, transceiver 202, communicating component 242, etc., can generate, based on the timing capability, the sidelink grant for the receiver UE for receiving sidelink communications or reporting feedback for the sidelink communications (e.g., in resource allocation mode 2 for sidelink communications). For example, grant generating component 256 can generate a feedback portion of the grant that indicates resources for reporting feedback based on the timing capability to allow enough time from the sidelink grant for the receiver UE to generate and report feedback.

In method 600, at Block 606, the sidelink grant can be transmitted to the receiver UE. In an aspect, communicating component 242, e.g., in conjunction with processor(s) 212, memory 216, transceiver 202, etc., can transmit the sidelink grant to the receiver UE. For example, communicating component 242 can transmit the sidelink grant, indicating sidelink resources for receiving sidelink communications from the transmitter UE (e.g., PSCCH/PSSCH resources) and indicating feedback resources (e.g., PSFCH resources) for the receiver UE to use in transmitting feedback to the transmitter UE.

Figure 7:
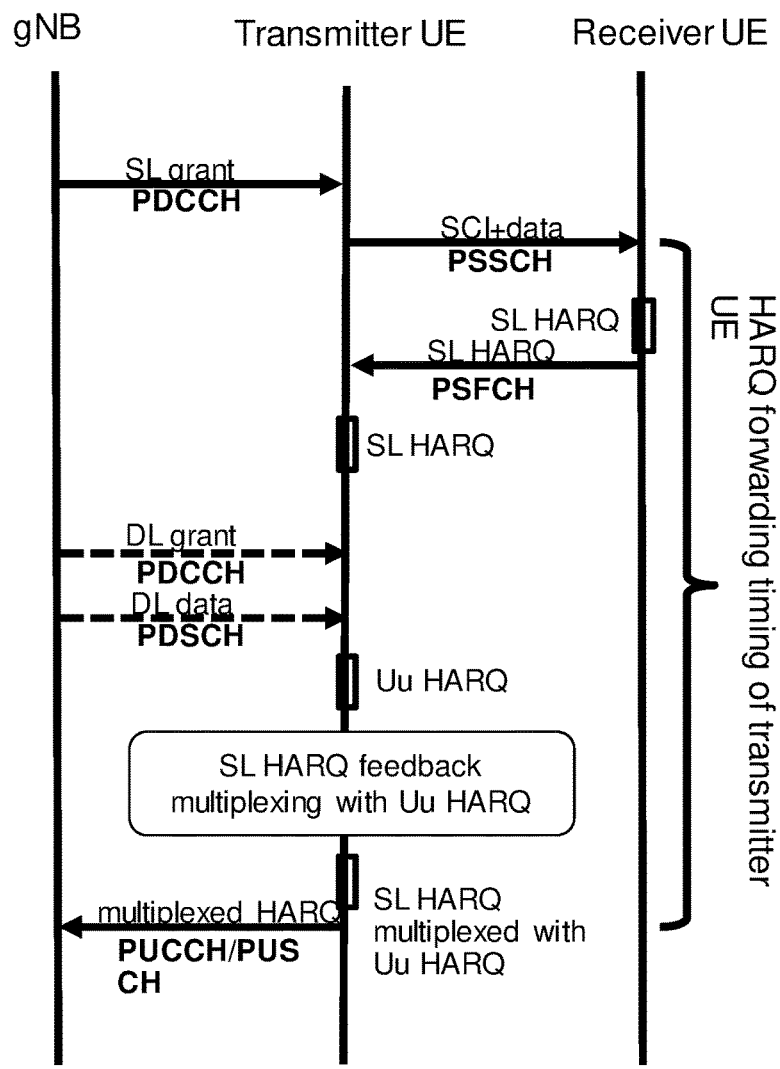
FIG. 7 illustrates a system for determining a feedback forwarding timing capability for resource allocation mode 1, in accordance with various aspects of the present disclosure.

FIG. 7 illustrates an example of a system 700 for indicating timing capability for resource allocation mode 1. In FIG. 7, the gNB allocates the HARQ forwarding resource to transmitter UE via SL DCI format or higher layer signaling. For SL UE, gNB can consider the HARQ forwarding timing capability. Similarly to kl (e.g., PDSCH-to-HARQ feedback timing indicator) defined for Uu interface, SL UE HARQ forwarding timing capability can be determined and may involve consideration of the maximum duration including: PSSCH data reception of receiver UE, HARQ reception and processing of transmitter UE, multiplexing or dropping processing with Uu HARQ/CSI bits, etc. In FIG. 7, the HARQ forwarding timing capability can be set or determined (or computed) as shown and indicated to the gNB to facilitate scheduling of the PUCCH resources for transmitting feedback to the gNB, as described herein.

Figure 8:
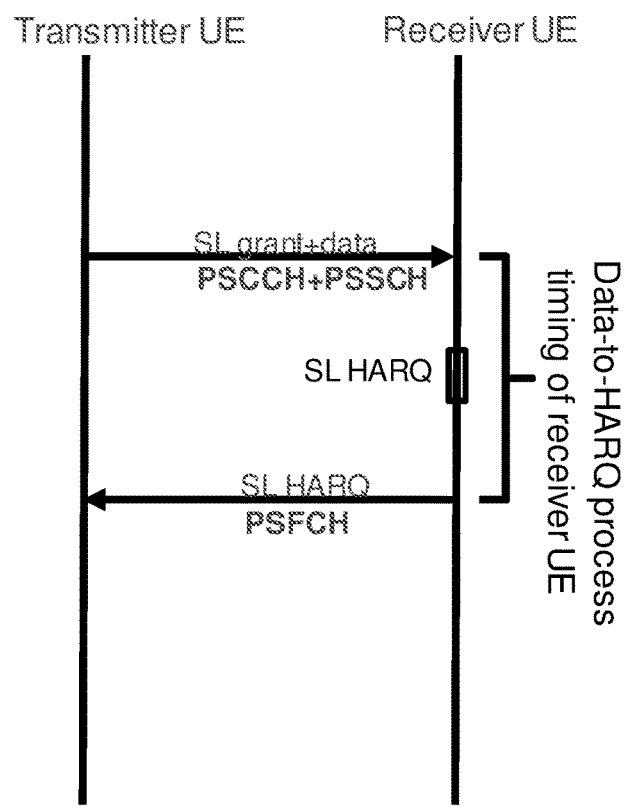
FIG. 8 illustrates a system for determining a timing capability for resource allocation mode 2, in accordance with various aspects of the present disclosure.

FIG. 8 illustrates an example of a system 800 for indicating timing capability for resource allocation mode 2. In FIG. 8, the transmitter UE allocates the data resource as well as the HARQ resource to receiver UE via SCI on PSCCH. In such cases, the SL Tx UE can consider the data-to-HARQ feedback timing capability of the SL Rx UE (which can be reported from receiver UE to transmitter UE via high layer signaling). In some cases, a default processing timing table can be defined for the SL receiver process in certain payload/MCS, and/or a default processing timing configuration/capability can be supported by all UEs, as described herein. In an example, the default timing can be used when reporting is not used or is not supported via high layer signaling, e.g., in groupcast case, FIG. 9 is a block diagram of a MIMO communication system 900 including a base station 102 and a UE 104, in accordance with various aspects of the present disclosure. The MIMO communication system 900 may illustrate aspects of the wireless communication access network 100 described with reference to FIG. 1. The base station 102 may be an example of aspects of the base station 102 described with reference to FIG. 1. In addition, the UE 104 can communicate with another UE over sidelink resources using similar functionality described herein with respect to UE 104 and base station 102 communications.

The base station 102 may be equipped with antennas 934 and 935, and the UE 104 may be equipped with antennas 952 and 953. In the MIMO communication system 900, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 920 may receive data from a data source. The transmit processor 920 may process the data. The transmit processor 920 may also generate control symbols or reference symbols. A transmit MIMO processor 930 may perform spatial processing (e.g., precoding) on data symbols, control symbols, or reference symbols, if applicable, and may provide output symbol streams to the transmit modulator/demodulators 932 and 933. Each modulator/demodulator 932 through 933 may process a respective output symbol stream (e.g., for OFDM, etc.) to obtain an output sample stream. Each modulator/demodulator 932 through 933 may further process (e.g., convert to analog, amplify, filter, and upconvert) the output sample stream to obtain a DL signal. In one example, DL signals from modulator/demodulators 932 and 933 may be transmitted via the antennas 934 and 935, respectively.

The UE 104 may be an example of aspects of the UEs 104 described with reference to FIGS. 1-2. At the UE 104, the UE antennas 952 and 953 may receive the DL signals from the base station 102 and may provide the received signals to the modulator/demodulators 954 and 955, respectively. Each modulator/demodulator 954 through 955 may condition (e.g., filter, amplify, downconvert, and digitize) a respective received signal to obtain input samples. Each modulator/demodulator 954 through 955 may further process the input samples (e.g., for OFDM, etc.) to obtain received symbols. A MIMO detector 956 may obtain received symbols from the modulator/demodulators 954 and 955, perform MIMO detection on the received symbols, if applicable, and provide detected symbols. A receive (Rx) processor 958 may process (e.g., demodulate, deinterleave, and decode) the detected symbols, providing decoded data for the UE 104 to a data output, and provide decoded control information to a processor 980, or memory 982.

The processor 980 may in some cases execute stored instructions to instantiate a communicating component 242 (see e.g., FIGS. 1 and 2).

On the uplink (UL), at the UE 104, a transmit processor 964 may receive and process data from a data source. The transmit processor 964 may also generate reference symbols for a reference signal. The symbols from the transmit processor 964 may be precoded by a transmit MIMO processor 966 if applicable, further processed by the modulator/demodulators 954 and 955 (e.g., for SC-FDMA, etc.), and be transmitted to the base station 102 in accordance with the communication parameters received from the base station 102. At the base station 102, the UL signals from the UE 104 may be received by the antennas 934 and 935, processed by the modulator/demodulators 932 and 933, detected by a MIMO detector 936 if applicable, and further processed by a receive processor 938. The receive processor 938 may provide decoded data to a data output and to the processor 940 or memory 942.

The processor 940 may in some cases execute stored instructions to instantiate a scheduling component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 900. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 900.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communication, comprising:
    determining, by a transmitter user equipment (UE) in sidelink communications with a receiver UE, a feedback forwarding timing capability based at least in part on a period of time between sidelink feedback channel resources associated with a last time period of a sidelink feedback channel and a time when the transmitter UE can transmit feedback, received from the receiver UE over the sidelink feedback channel resources, to an access point; and
    receiving, from the access point and based on the feedback forwarding timing capability, at least an uplink resource grant for transmitting feedback for at least one of sidelink communications or downlink communications.

2. The method of claim 1, wherein the feedback forwarding timing capability corresponds to a default processing timing for multiple UEs.

3. The method of claim 1, further comprising transmitting, to the access point and based on the uplink resource grant, the feedback from the receiver UE over an uplink channel.

4. The method of claim 3, further comprising multiplexing, with the feedback from the receiver UE, feedback for a downlink channel received from the access point.

5. The method of claim 1, further comprising receiving, from the access point and based on the feedback forwarding timing capability, a downlink resource grant for receiving the downlink communications.

6. The method of claim 1, wherein determining the feedback forwarding timing capability is further based at least in part on a second timing for at least one of receiving sidelink communications at the receiver UE or reporting the feedback for the sidelink communications by the receiver UE.

7. The method of claim 6, further comprising determining the second timing of the receiver UE, and wherein indicating the feedback forwarding timing capability comprises indicating, to the access point, the second timing.

8. The method of claim 7, wherein determining the second timing comprises receiving, from the receiver UE, an indication of the second timing.

9. The method of claim 7, wherein determining the second timing comprises determining a default timing for the at least one of receiving sidelink communications at the receiver UE or reporting the feedback for the sidelink communications by the receiver UE.

10. The method of claim 9, wherein determining the default timing is based at least in part on at least one of a payload size or a modulation and coding scheme (MCS) associated with the sidelink communications for the receiver UE.

11. The method of claim 6, wherein determining the feedback forwarding timing capability is further based at least in part on a third timing for multiplexing the feedback from the receiver UE with downlink feedback for downlink communications received from the access point.

12. The method of claim 11, further comprising determining the third timing based at least in part on at least one of feedback codebook types or feedback handling and/or dropping rules defined for reporting the downlink feedback.

13. The method of claim 1, further comprising indicating, to the access point, the feedback forwarding timing capability.

14. The method of claim 13, wherein indicating the feedback forwarding timing capability comprises transmitting an indication of the feedback forwarding timing capability using radio resource control (RRC) signaling.

15. A method for wireless communication, comprising:
determining, for a transmitter user equipment (UE) in sidelink communications with a receiver UE, a feedback forwarding timing capability based at least in part on a period of time between sidelink feedback channel resources associated with a last time period of a sidelink feedback channel and a time when the transmitter UE can transmit feedback received from the receiver UE over the sidelink feedback channel resources;
generating, based at least in part on the feedback forwarding timing capability, an uplink grant for the transmitter UE; and
transmitting, to the transmitter UE, the uplink grant.

16. The method of claim 15, wherein the feedback forwarding timing capability corresponds to a default processing timing for multiple UEs.

17. The method of claim 15, further comprising determining a second timing for at least one of receiving sidelink communications at the receiver UE or reporting the feedback for the sidelink communications by the receiver UE, wherein generating the uplink grant is further based at least in part on the second timing.

18. The method of claim 17, wherein determining the second timing comprises receiving an indication of the second timing from at least one of the transmitter UE or the receiver UE.

19. The method of claim 15, further comprising determining a third timing for multiplexing, by the transmitter UE, the feedback from the receiver UE with downlink feedback for downlink communications transmitted to the transmitter UE based at least in part on at least one of feedback codebook types or feedback handling and/or dropping rules defined for reporting the downlink feedback, wherein generating the uplink grant is further based at least in part on the third timing.

20. An apparatus for wireless communication, comprising:
a transceiver;
a memory configured to store instructions; and
one or more processors communicatively coupled with the memory and the transceiver, wherein the one or more processors are configured to:
determine, by the apparatus as a transmitter user equipment (UE) in sidelink communications with a receiver UE, a feedback forwarding timing capability based at least in part on a period of time between sidelink feedback channel resources associated with a last time period of a sidelink feedback channel and a time when the transmitter UE can transmit feedback, received from the receiver UE over the sidelink feedback channel resources, to an access point; and
receive, from the access point and based on the feedback forwarding timing capability, at least an uplink resource grant for transmitting feedback for at least one of sidelink communications or downlink communications.

21. The apparatus of claim 20, wherein the feedback forwarding timing capability corresponds to a default processing timing for multiple UEs.

22. The apparatus of claim 20, wherein the one or more processors are further configured to transmit, to the access point and based on the uplink resource grant, the feedback from the receiver UE over an uplink channel.

23. The apparatus of claim 22, wherein the one or more processors are further configured to multiplex, with the feedback from the receiver UE, feedback for a downlink channel received from the access point.

24. The apparatus of claim 20, wherein the one or more processors are further configured to receive, from the access point and based on the feedback forwarding timing capability, a downlink resource grant for receiving the downlink communications.

25. The apparatus of claim 20, wherein the one or more processors are configured to determine the feedback forwarding timing capability further based at least in part on a second timing for at least one of receiving sidelink communications at the receiver UE or based on reporting the feedback for the sidelink communications by the receiver UE.

26. The apparatus of claim 25, wherein the one or more processors are further configured to determine the second timing of the receiver UE, and wherein the one or more processors are configured to indicate the feedback forwarding timing capability at least in part by indicating, to the access point, the second timing.

27. The apparatus of claim 26, wherein the one or more processors are configured to determine the second timing at least in part by receiving, from the receiver UE, an indication of the second timing.

28. The apparatus of claim 26, wherein the one or more processors are configured to determine the second timing at least in part by determining a default timing for the at least one of receiving sidelink communications at the receiver UE or reporting the feedback for the sidelink communications by the receiver UE.

29. An apparatus for wireless communication, comprising:
a transceiver;
a memory configured to store instructions; and
one or more processors communicatively coupled with the memory and the transceiver, wherein the one or more processors are configured to:
determine, for a transmitter user equipment (UE) in sidelink communications with a receiver UE, a feedback forwarding timing capability based at least in part on a period of time between sidelink feedback channel resources associated with a last time period of a sidelink feedback channel and a time when the transmitter UE can transmit feedback received from the receiver UE over the sidelink feedback channel resources;
generate, based at least in part on the feedback forwarding timing capability, an uplink grant for the transmitter UE; and
transmit, to the transmitter UE, the uplink grant.

30. The apparatus of claim 29, wherein the feedback forwarding timing capability corresponds to a default processing timing for multiple UEs.

* * * * *